(12) United States Patent
Moffat et al.

(10) Patent No.: US 7,544,907 B1
(45) Date of Patent: Jun. 9, 2009

(54) SPECIAL PROVISIONS FOR NETWORK PROTECTOR RETROFITS

(75) Inventors: John R. Moffat, Greenwood, SC (US); Stephen W. Oneufer, Greenwood, SC (US); Mark A. Faulkner, Greenwood, SC (US); Phillip D. Miller, Greenwood, SC (US); Arthur J. Jur, Greenwood, SC (US); John M. Kokenda, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/954,599

(22) Filed: Dec. 12, 2007

(51) Int. Cl.
*H01H 9/00* (2006.01)

(52) U.S. Cl. ................. 200/50.21; 200/400; 335/8; 361/624

(58) Field of Classification Search ............... 200/50.1, 200/50.11, 50.12, 50.21, 400, 48 R; 361/62, 361/115, 611, 624; 335/6, 8, 202
See application file for complete search history.

(56) References Cited

U.S. PATENT DOCUMENTS

| 4,620,076 | A  | * | 10/1986 | Mrenna et al. ............... 200/304 |
| 5,488,337 | A  | * | 1/1996  | Hubbard et al. ............. 335/202 |
| 6,211,759 | B1 | * | 4/2001  | Little et al. ................. 335/202 |
| 6,930,577 | B2 | * | 8/2005  | Subramanian et al. ...... 335/202 |

\* cited by examiner

*Primary Examiner*—Kyung Lee
(74) *Attorney, Agent, or Firm*—Martin J. Moran

(57) ABSTRACT

A retrofit assembly structured to allow a CM22 type circuit breaker to engage, and be enclosed by, a CMD type circuit breaker tank is provided. The retrofit assembly includes a levering mechanism, a circuit breaker bus assembly having bus support members, and a door handle system structured to allow a user to actuate the circuit breaker contacts when the tank is closed.

20 Claims, 6 Drawing Sheets

SPECIAL PROVISIONS FOR NETWORK PROTECTOR RETROFITS

BACKGROUND OF THE INVENTION

1. Field of the Invention

The present invention relates to CM22 type circuit breakers and CMD circuit breaker type enclosures and, more specifically to a retrofit assembly structured to allow a CM22 type circuit breaker to operatively engage a CMD circuit breaker type enclosure.

2. Background Information

Secondary power distribution networks consist of interlaced grids which are supplied by two or more sources of power so that the loss of a single source of power will not result in an interruption of service. Such secondary power distribution networks provide the highest level of reliability possible with conventional power distribution and are normally used to supply high-density load areas such as a section of a city, a large building, or an industrial site. Between a power source and the network is a transformer and a network protector. The network protector consists of a circuit breaker and a control relay. The circuit breaker includes at least one set of main contacts that move between an open position and a closed position. When the main contacts are closed, electricity may flow through the network protector. The control relay senses the transformer and network voltages and line currents then executes algorithms to initiate a breaker tripping or closing action. Trip determination is based on detecting an overcurrent condition or reverse power flow, that is, power flow from the network to the energy source. Network protectors are often found in dust-proof or moisture-proof housings, or vaults, which are disposed in subterranean passageways in large metropolitan areas. More specifically, an enclosure, or "tank," is disposed with the vault and the network protector is disposed within the tank.

The network protector circuit breaker includes a number of other components such as, but not limited to, a bus assembly, an operating mechanism structured to move the contacts between the open position and the closed position, and a frame assembly. The circuit breaker bus assembly has a line assembly and a load assembly. The circuit breaker bus assembly line assembly includes at least one line bus that is coupled to, and in electrical communication with, the line side of the main contacts. Similarly, the circuit breaker bus assembly load assembly includes at least one load bus that is coupled, and in electrical communication with, the load side of the main contacts. The operating mechanism includes a closing device structured to move the main contacts to the closed position. Typically, a close device may be either a non-stored energy device, wherein a motor or other device closes the contacts, or a stored energy device, wherein springs, which are compressed by a motor or by a crank, are used to close the main contacts. The frame assembly supports the circuit breaker and is structured to engage the tank.

The tank includes a number of components that are coupled to the network protector components, or, that extend between the network protector and other elements of the power distribution network. For example, the tank includes a bus assembly having a line assembly and a load assembly. The tank bus assembly line assembly includes at least one line bus that is coupled to, and in electrical communication with, the power distribution network line conductor and is structured to engage the circuit breaker bus assembly line bus assembly. Similarly, the tank bus assembly load assembly includes at least one load bus that is coupled to, and in electrical communication with, the power distribution network load conductor and is structured to engage the circuit breaker bus assembly load bus assembly. The coupling between the network protector bus assembly and the circuit breaker bus assembly may be accomplished in several ways including a fixed connection, wherein the bus members are fixed to each other with a fastener, or, a primary disconnect, wherein one bus member is a stab and the other bus member has a jaw assembly that resiliently grips the stab.

The tank may also have a barrier assembly having at least one non-conductive member structured to be disposed between selected buses on either or both the tank bus assembly or the circuit breaker bus assembly. Further, there is typically an extendable rail assembly that allows the circuit breaker to be moved into, or out of, the tank. Each of these components, as well as others, are structured to operate/engage a specific type of circuit breaker.

That is, the tank is structured to have a specific type of circuit breaker with components in a specific configuration disposed therein. Each type of circuit breaker, while generally performing the same function, includes various different components. For example, a CM22 type circuit breaker includes a bus assembly having a line assembly and a load assembly having a fixed connection which is, for example, a bolted bus connection. That is, a CM22 type circuit breaker bus assembly is structured to be bolted to the tank bus assembly. Conversely, a CMD type circuit breaker bus assembly includes a primary disconnect assembly on each line and load bus. Each primary disconnect assembly includes a number of linearly aligned, opposing jaw members that are biased toward each other by springs. That is, the jaw members define a narrow gap. When a CMD type circuit breaker is moved into a tank, the tank bus assembly bus members, or stabs, are disposed within the gaps between the jaw members. To assist with the coupling/decoupling of the primary disconnects, a CMD type circuit breaker tank includes a levering mechanism that forces each primary disconnect assembly to slide over a tank bus assembly bus member. Thus, a tank structured to enclose/engage a CM22 type circuit breaker includes a tank bus assembly structured to be bolted to the CM22 type circuit breaker. A tank structured to enclose/engage a CMD type circuit breaker includes a tank bus assembly having buses structured to slide into a primary disconnect assembly. Further, the locations of the various bus members are different for different types of circuit breakers.

Other components of the different types of circuit breakers may have other differences. For example, a CM22 type circuit breaker utilizes a motor to close the circuit breaker contacts whereas the CMD type circuit breaker utilizes "stored-energy," that is, a system of springs, to close the circuit breaker contacts. The tanks corresponding to such circuit breakers were adapted to actuate the relevant closing mechanism. For example, the tank for a CM22 type circuit breaker included an external switch structured to actuate the closing motor. Conversely, the tank for a CMD type circuit breaker did not have such a switch as the CMD type circuit breaker did not have a closing motor.

Thus, each type of circuit breaker was only structured to be placed in a tank having a corresponding configuration. Or, stated another way, each tank was adapted to accept a single type of circuit breaker. This is a disadvantage as users may like to swap out different types of circuit breakers in a single enclosure. For example, presently there are a number of CMD type circuit breaker tanks wherein users desire to install a CM22 type circuit breaker. There is, therefore, a need for a retrofit assembly and kit for a CM22 type circuit breaker structured to allow a CM22 type circuit breaker to engage, and be enclosed by, a CMD type circuit breaker tank.

SUMMARY OF THE INVENTION

This need, and others, is met by at least one embodiment of the invention recited in the claims set forth below. A retrofit assembly structured to allow a CM22 type circuit breaker to engage, and be enclosed by, a CMD type circuit breaker tank includes a levering mechanism, a circuit breaker bus assembly having bus support members, and a door handle system structured to allow a user to actuate the circuit breaker contacts when the tank is closed.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, a "CM22 type circuit breaker" means a circuit breaker with Model Nos. CM22 and/or CM-22 manufactured by Eaton Corporation located at Eaton Center, 1111 Superior Avenue, Cleveland, Ohio 44114.

As used herein, a "CMD type circuit breaker" means a circuit breaker with Model No. CMD manufactured by Eaton Corporation located at Eaton Center, 1111 Superior Avenue, Cleveland, Ohio 44114 and formerly manufactured by Westinghouse Electric Corporation, Pittsburgh, Pa. 15219.

As is known in the art, circuit breakers may have one or more pairs of separable contacts each being a different phase or "pole." Typically, each pair of separable contacts has an associated line conductor and load conductor which is not in electrical communication with the line/load conductor associated with a different pair of separable contacts. Similarly, the circuit breaker bus assembly and tank bus assembly each have a line bus and a load bus associated with each pair of separable contacts. As discussed below, in the preferred embodiment, the circuit breaker has three pairs of separable contacts. Thus, as shown in the figures, the circuit breaker bus assembly and tank bus assembly each have three-line buses and three load buses; however, it is understood that this invention applies to circuit breakers having more, or less, than three pairs of separable contacts and that the description and depiction of three pairs of separable contacts is exemplary only.

Figure 1:
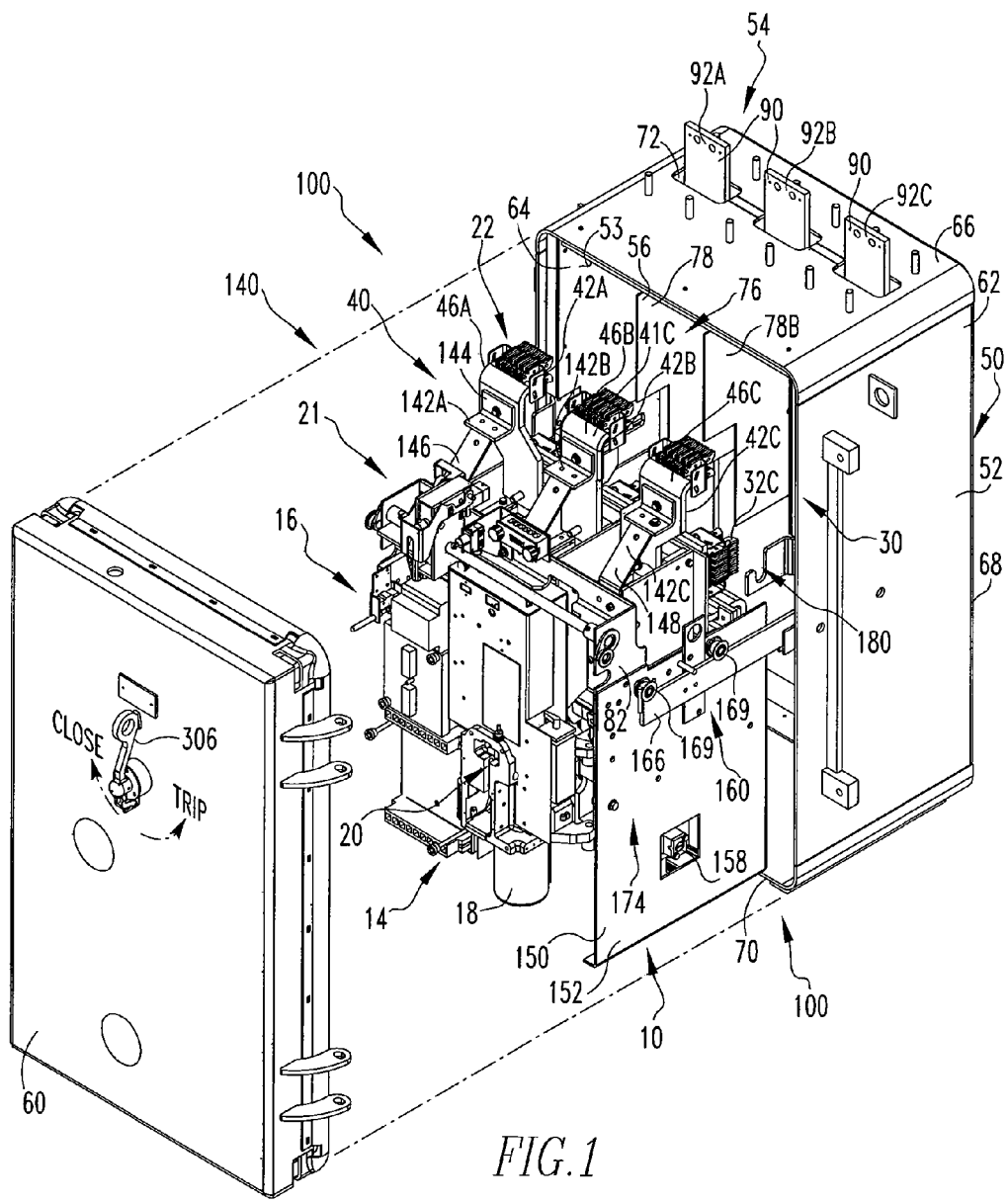
FIG. 1 is an isometric view of a CM22 type circuit breaker and a CMD type circuit breaker tank.
Figure 2:
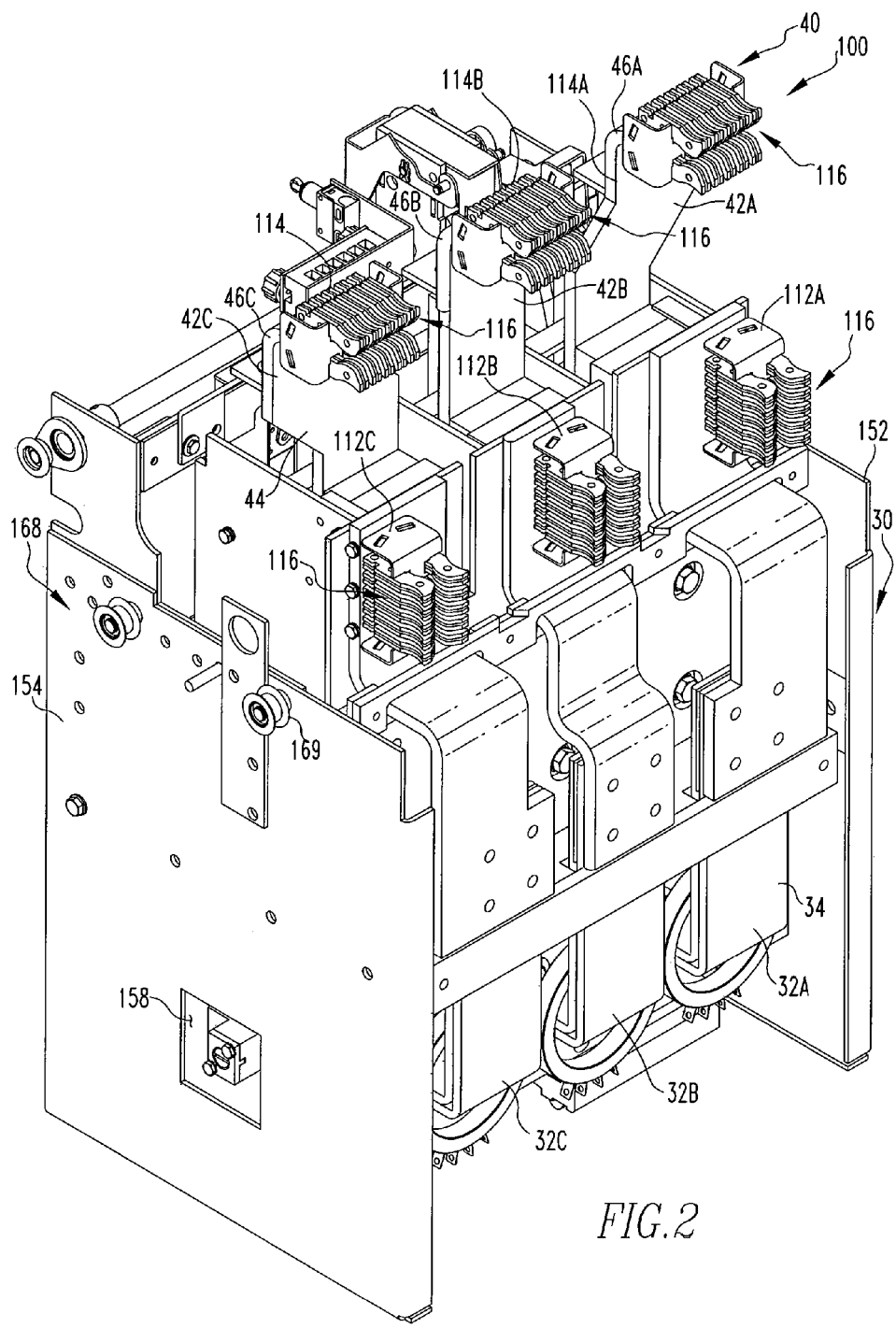
FIG. 2 is a rear isometric view of a CM22 type circuit breaker with the retrofit bus assembly.

As shown in FIGS. 1 and 2, a retrofit assembly 100 structured to allow a CM22 type circuit breaker 10 to be coupled to a CMD type tank 50 is disclosed. The CM22 type circuit breaker 10 includes, a housing 14, an operating mechanism 16 having a closing motor 18, a trip device 20, and a circuit breaker bus assembly 22. The circuit breaker bus assembly 22 includes a circuit breaker bus assembly line bus assembly 30 and a circuit breaker bus assembly load bus assembly 40 (both detailed below). As is known in the art, within the housing 14 are three pairs of separable contacts (not shown). Each pair of contacts includes a movable contact (not shown) that is in electrical communication with a circuit breaker bus assembly load bus assembly bus 42A, 42B, 42C and a fixed contact (not shown) that is in electrical communication with a circuit breaker bus assembly line bus assembly bus 32A, 32B, 32C (described below). The operating mechanism 16 is structured to separate the contacts and to close the contacts. That is, the trip device 20 is structured to cause the operating mechanism 16 to separate each pair of contacts separate upon the occurrence of a trip condition, and the closing motor 18 is structured to cause the operating mechanism 16 to close the contacts. The CM22 type circuit breaker 10 may also include a manual closing system 21.

The circuit breaker bus assembly line bus assembly 30 includes three buses 32A, 32B, 32C. Each circuit breaker bus assembly line bus assembly bus 32A, 32B, 32C has a generally flat, elongated body 34. The circuit breaker bus assembly line bus assembly bus 32A, 32B, 32C generally extends longitudinally in a vertical direction. The wide face of each circuit breaker bus assembly line bus assembly bus 32A, 32B, 32C extends in a plane generally parallel to the housing back member 68 (discussed below).

The circuit breaker bus assembly load bus assembly 40 includes three buses 42A, 42B, 42C. Each circuit breaker bus assembly load bus assembly bus 42A, 42B, 42C has a generally flat, elongated body 44. The circuit breaker bus assembly load bus assembly bus 42A, 42B, 42C generally extends longitudinally in a vertical direction. The wide face of each circuit breaker bus assembly load bus assembly bus 42A, 42B, 42C extends in a plane generally parallel to the housing back member 68. The upper distal end 46A, 46B, 46C of each circuit breaker bus assembly load bus assembly bus 42A, 42B, 42C is curved to be generally horizontal and extends toward the housing back member 68.

Figure 3:
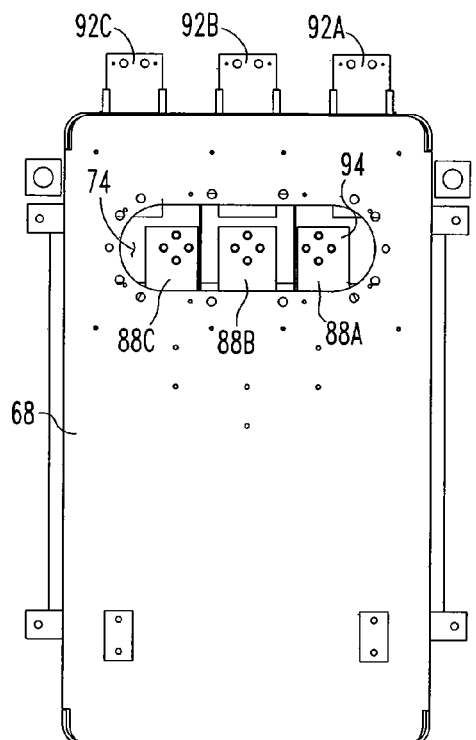
FIG. 3 is a rear view of a tank housing assembly.

The tank 50 includes a housing assembly 52 defining an enclosed space 53, a bus assembly 54 and a barrier system 56. The tank housing assembly 52 is sized to enclose the CM22 type circuit breaker 10. The tank housing assembly 52 includes a movable, or removable, door 60, two lateral side members 62, 64, a top member 66, a back member 68, and a bottom member 70. The top member 66 includes one opening 72 for each tank bus assembly load assembly load bus 92A, 92B, 92C (described below). The back member 68 includes one or more openings 74 (FIG. 3) for each tank bus assembly line assembly line bus 82A, 82B, 82C (described below). The openings 72, 74 allow each tank bus assembly load assembly load bus 92A, 92B, 92C and each tank bus assembly line assembly line bus 82A, 82B, 82C to extend through the housing assembly 52 and/or be coupled to, and in electrical communication with, either a line conductor (not shown) or a load conductor (not shown). The tank 50 further includes a non-conductive barrier assembly 76 having two generally flat, plate-like members 78A, 78B. The barrier assembly plate-like members 78A, 78B are coupled to the housing assembly top member 66 and extend downwardly. The barrier assembly plate-like members 78A, 78B extend in planes generally parallel to the housing assembly lateral side members 62, 64. The barrier assembly plate-like members 78A, 78B are structured to be disposed between the tank bus assembly 54 and circuit breaker bus assembly 22 that are in different phases.

Figure 5:
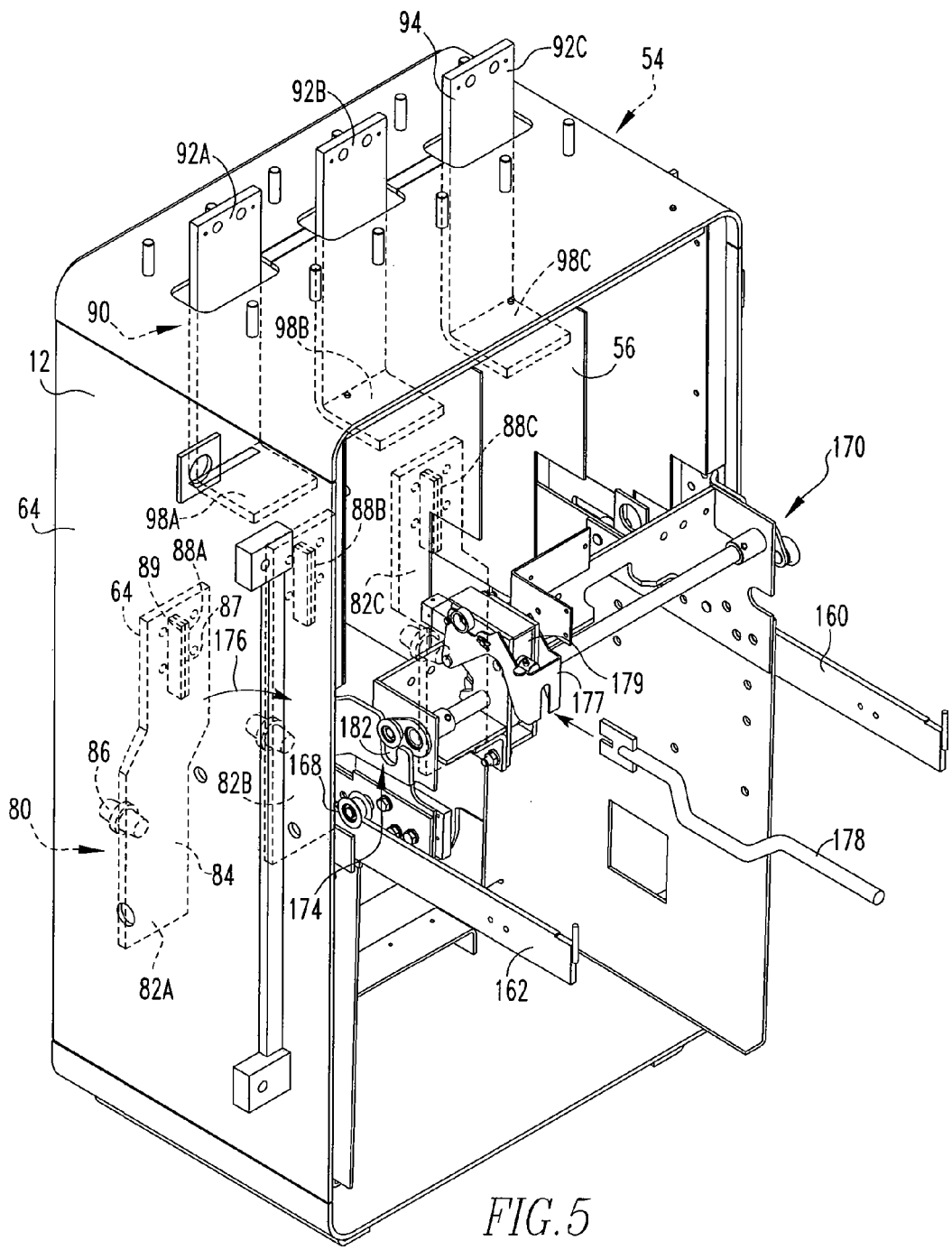
FIG. 5 is an isometric view of a tank housing assembly and a levering mechanism.

The tank bus assembly 54 includes a line bus assembly 80 and a load bus assembly 90, shown in FIG. 5. The tank bus assembly line bus assembly 80 includes three tank bus assembly line bus assembly line buses 82A, 82B, 82C. Each tank bus assembly line bus assembly line bus 82A, 82B, 82C has a generally flat, elongated body 84. The tank bus assembly line bus assembly line buses 82A, 82B, 82C generally extend longitudinally in a vertical direction. The wide face of each tank bus assembly line bus assembly line bus 82A, 82B, 82C extends in a plane generally parallel to the housing back member 68. Each tank bus assembly line bus assembly line bus 82A, 82B, 82C is coupled by at least one insulated coupling device 86 to the housing back member 68. Each tank bus assembly line bus assembly line bus 82A, 82B, 82C extends generally adjacent to the housing back member 68. Each tank bus assembly line bus assembly line bus 82A, 82B, 82C further includes a line stab 88A, 88B, 88C. Each line stab 88A, 88B, 88C is a thin, flat plate member 87 coupled to a line bus 82A, 82B, 82C. Each plate member 87 has a thin, vertically extending edge 89.

The load bus assembly 90 includes three tank bus assembly load buses 92A, 92B, 92C. Each tank bus assembly load bus assembly load bus 92A, 92B, 92C has a generally flat, elongated body 94. The tank bus assembly load bus assembly load buses 92A, 92B, 92C generally extend longitudinally in a vertical direction. The wide face of each tank bus assembly load bus assembly load bus 92A, 92B, 92C extends in a plane generally parallel to the housing back member 68. Each tank bus assembly load bus assembly load bus 92A, 92B, 92C is coupled by at least one insulated coupling device (not shown) to the housing top member 66. Each tank bus assembly load bus assembly load bus 92A, 92B, 92C is disposed at a location generally forward of each line bus 82A, 82B, 82C. The lower end of each tank bus assembly load bus assembly load bus 92A, 92B, 92C is curved forward to form a load stab 98A, 98B, 98C. The line stabs 88A, 88B, 88C and the load stabs 98A, 98B, 98C are structured to be coupled to a primary disconnect of a CMD type circuit breaker 10.

As set forth above, the CM22 type circuit breaker 10 formerly included a fixed connection bus assembly (not shown) that was structured to be bolted to the tank bus assembly 54. The retrofit assembly 100 includes a bus assembly retrofit assembly 110 structured to allow the CM22 type circuit breaker 10 to be coupled to the line stabs 88A, 88B, 88C and the load stabs 98A, 98B, 98C in a manner similar to a CMD type circuit breaker 10. Accordingly, the bus assembly retrofit assembly 110 includes a line primary disconnect 112A, 112B, 112C for each circuit breaker bus assembly line bus assembly bus 32A, 32B, 32C and a load primary disconnect 114A, 114B, 114C for each circuit breaker bus assembly load bus assembly bus 42A, 42B, 42C. As is known in the art, each line primary disconnect 112A, 112B, 112C and each load primary disconnect 114A, 114B, 114C includes a plurality of conductive members 116 that are disposed in two opposing lines and biased toward each other in a jaw-like manner. The conductive members 116 are structured to engage, and be in electrical communication with, the associated line stabs 88A, 88B, 88C or the load stabs 98A, 98B, 98C. Accordingly, each line primary disconnect 112A, 112B, 112C is coupled to a circuit breaker bus assembly line bus assembly bus 32A, 32B, 32C with the jaw axis extending generally vertically so that the line primary disconnects 112A, 112B, 112C may engage the vertically extending edge 89 of the associated line stab 88A, 88B, 88C. The line primary disconnects 112A, 112B, 112C are coupled to the circuit breaker bus assembly load bus assembly bus 42A, 42B, 42C by a bus assembly retrofit assembly 110 line coupling assembly 120 (described below). Each load primary disconnect 114A, 114B, 114C is coupled to an associated circuit breaker bus assembly load bus assembly bus upper distal end 46A, 46B, 46C. Each load primary disconnect 114A, 114B, 114C has the jaw axis extending generally horizontally so that the load primary disconnects 114A, 114B, 114C may engage the horizontal line stabs 88A, 88B, 88C.

Figure 4:
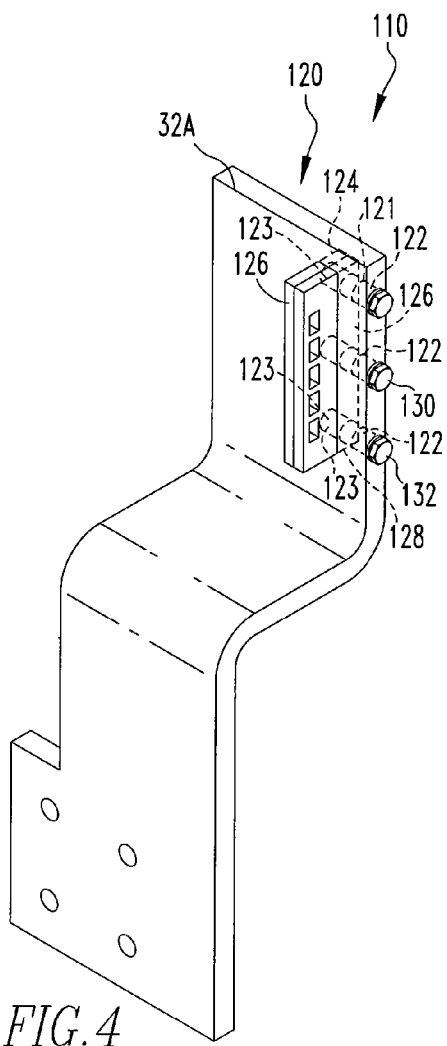
FIG. 4 is a detailed view of a retrofit bus assembly line conductor.

As shown in FIG. 4, the bus assembly retrofit assembly line coupling assembly 120 includes at least one, and preferably a plurality of, lateral openings 122 and a slot 124, as shown in FIG. 4, cut into each circuit breaker bus assembly line bus assembly bus 32A, 32B, 32C. Each line coupling assembly slot 124 extends generally longitudinally on the associated circuit breaker bus assembly line bus assembly bus 32A, 32B, 32C. The line coupling assembly lateral openings 122 on a specific circuit breaker bus assembly line bus assembly bus 32A, 32B, 32C are associated with the line coupling assembly slot 124 therethough. Preferably, each line coupling assembly lateral opening 122 extends through the associated line coupling assembly slot 124 thereby dividing the line coupling assembly opening 122 into a proximal opening 121, adjacent a lateral side of each associated circuit breaker bus assembly line bus assembly bus 32A, 32B, 32C, and a distal bore 123, disposed on the inner side of each associated line coupling assembly slot 124. The inner surface of each proximal opening 121 is generally smooth. The inner surface of the distal bore 123 is a threaded surface 125. Each line primary disconnect 112A, 112B, 112C includes a stem 126 structured to fit snugly in a slot 124. Each stem 126 includes openings 128 structured to align with a lateral opening 122 and thereby create a continuous passage. Fasteners 130, such as bolts 132 are passed through the lateral opening 122 and the stem openings 128 and engage the threaded surface 125. In this configuration, the bolts 132 may be tightened to compress the stems 126 within the slots 124 in a vice-like manner.

As shown in FIG. 1, the bus assembly retrofit assembly 110 also includes a line bus support assembly 140 structured to resist horizontal flexing of the circuit breaker bus assembly load bus assembly buses 42A, 42B, 42C. That is, the circuit breaker bus assembly load bus assembly buses 42A, 42B, 42C having a load primary disconnect 114A, 114B, 114C thereon exposed to a horizontal force when the load primary disconnects 114A, 114B, 114C are coupled to the load stabs 98A, 98B, 98C. This horizontal force occurs when the load primary disconnects 114A, 114B, 114C engages the load stabs 98A, 98B, 98C. As the CM22 type circuit breaker 10 is not structured to counteract this force, a line bus support assembly 140 is required. The load bus support assembly 140 includes a load bus support 142A, 142B, 142C for each circuit breaker bus assembly load bus assembly bus 42A, 42B, 42C. Each load bus support 142A, 142,B, 142C has a non-conducive mounting 144 and an elongated support member 146. A non-conducive mounting 144 is coupled to each circuit breaker bus assembly load bus assembly bus 42A, 42B, 42C, preferably on the front side. Each elongated support member 146 is coupled to, and extends between, a non-conducive mounting 144 and the circuit breaker frame assembly 150 (described below) or circuit breaker housing 14. In this configuration, each load bus support 142A, 142,B, 142C substantially prevents the associated circuit breaker bus assembly load bus assembly bus 42A, 42B, 42C from flexing as the load primary disconnects 114A, 114B, 114C are coupled to the load stabs 98A, 98B, 98C. Preferably, the elongated support members 146 have a protective covering 148 as the elongated support members 146 are disposed over the arc chutes, which vent arc gases, for the CM22 type circuit breaker 10.

As shown in FIG. 5, the tank housing assembly 52 includes a pair of retractable rails 160, 162. Each rail 160, 162 is coupled to one of the tank lateral side members 62, 64. The rails 160, 162 may be moved between an extended position wherein the rails 160,162 extend from the tank 50 front side (FIG. 1) and a retracted position wherein the rails 160, 162 are disposed in the tank enclosed space 53. The rails 160, 162 extend generally horizontally when in the extended position. The retrofit assembly 100 also includes a frame assembly 150 structured to allow the CM22 type circuit breaker 10 to engage the CMD tank 50. The frame assembly 150 includes two side plates 152, 154 (FIG. 5 has one plate removed for clarity) and a cross-frame assembly 156. The side plates 152, 154 are held in a spaced relation by the cross-frame assembly 156. The side plates 152, 154 laterally define the space the CM22 type circuit breaker 10 may occupy. The side plates 152, 154 include access openings 158 structured to allow access to the CM22 type circuit breaker 10. The cross-frame assembly 156, preferably, includes elements of the levering mechanism 170 (described below). The circuit breaker frame assembly 150 also includes a two pairs of generally aligned rollers 166, 168. The rollers 166, 168 are rotatably coupled to the side plates 152, 154 and structured to engage, that is, roll upon, the rails 160, 162. Each pair of rollers 166, 168 includes two generally, horizontally aligned wheels 169. As the CM22 type circuit breaker 10 is being moved into, or out of, the tank 50, the CM22 type circuit breaker 10 generally rolls on the rollers 166, 168 over the rails 160, 162; however, a greater force is required during the period wherein the line primary disconnects 112A, 112B, 112C and load primary disconnects 114A, 114B, 114C engage the associated line stabs 88A, 88B, 88C and load stabs 98A, 98B, 98C.

That is, as set forth above, each line primary disconnect 112A, 112B, 112C and each load primary disconnect 114A, 114B, 114C includes a plurality of conductive members 116 that are disposed in two opposing lines and biased toward each other in a jaw-like manner. In order for the line primary disconnects 112A, 112B, 112C and each load primary disconnects 114A, 114B, 114C to engage the associated line stabs 88A, 88B, 88C and load stabs 98A, 98B, 98C, the retrofit assembly 100 includes a levering mechanism 170 structured to move the CM22 type circuit breaker 10 into and out of the tank 50 during the period wherein the line primary disconnects 112A, 112B, 112C and load primary disconnects 114A, 114B, 114C engage the associated line stabs 88A, 88B, 88C and load stabs 98A, 98B, 98C.

The levering mechanism 170 includes an elongated shaft 172, a hook assembly 174 (FIG. 1), 176 (FIGS. 5, 5A, 5B) disposed at each end of the shaft 172, a crank 178 and a worm and gear arrangement 179. The shaft 172 extends generally laterally and the tips of the shaft 172 are each disposed adjacent to a tank housing assembly of lateral side member 62, 64. As is known in the art, the crank 178 engages the worm and gear arrangement 179 and is structured to engage and rotate shaft 172 as described below. The worm and gear arrangement 179 is behind a cover 177 that is coupled to an interlock, not shown. When the levering mechanism cover 177 interlock is actuated, the main contacts are separated. Thus, a user cannot use the levering mechanism 170 to remove the circuit breaker 10 from the tank 50 with the contacts in the closed position. The levering mechanism 170 is coupled to the front side of said circuit breaker 10.

Figure 5A:
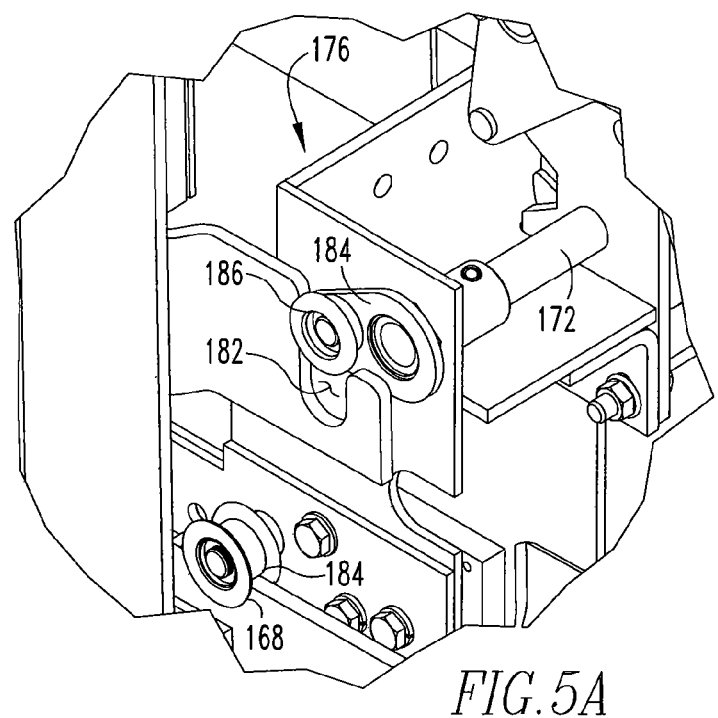
FIG. 5A is a detailed view of the levering mechanism hook before engaging the hook pocket.
Figure 5B:
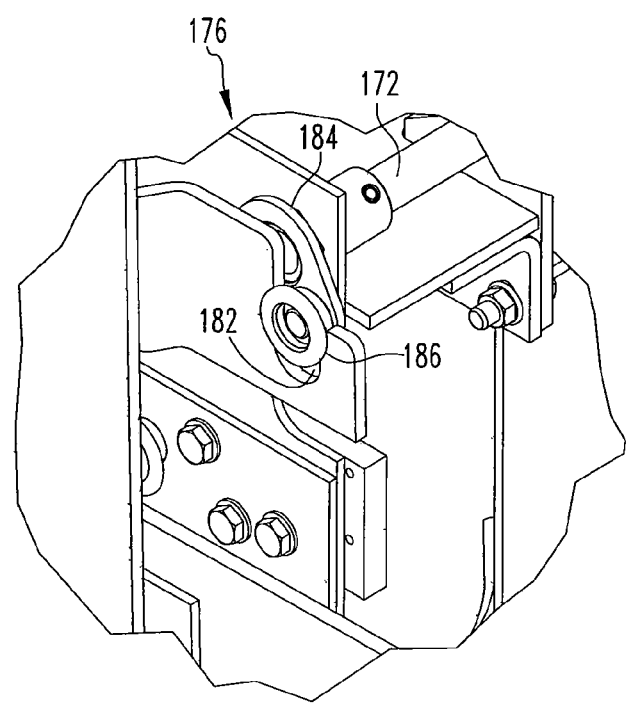
FIG. 5B is a detailed view of the levering mechanism hook after engaging the hook pocket.

The tank housing assembly 52 includes a fixed hook pocket 180 (FIG. 1), 182 (FIG. 5) disposed on each tank housing assembly lateral side member 62, 64. As shown in FIG. 5A, each hook assembly 174, 176 includes an offset 184 and a laterally extending hook 186. Each offset 184 extends radially from the levering mechanism shaft 172. Each laterally extending hook 186 extends from the distal end of the associated offset 184. As such, when the levering mechanism shaft 172 rotates, each laterally extending hook 186 moves through an arc as shown in FIGS. 5A and 6A. The levering mechanism 170 is coupled to the CM22 type circuit breaker 10 with the levering mechanism shaft 172 extending through two aligned openings in the circuit breaker frame assembly 150.

In this configuration, the levering mechanism 170 is structured to couple/decouple the circuit breaker bus assembly 22 and the tank bus assembly 54. That is, the CM22 type circuit breaker 10 is positioned substantially within the tank 50 with the line primary disconnects 112A, 112B, 112C and load primary disconnects 114A, 114B, 114C starting to engage the associated line stabs 88A, 88B, 88C and load stabs 98A, 98B, 98C. In this position, the levering mechanism shaft 172 extends, generally laterally, across the circuit breaker 10 with each laterally extending hook 186 is disposed adjacent to the associated fixed hook pocket 180, 182. When the crank 178 actuates the worm and gear arrangement 179, the levering mechanism shaft 172 rotates and each laterally extending hook 186 moves through an arc and engages the associated fixed hook pocket 180, 182 and causes the line primary disconnects 112A, 112B, 112C and load primary disconnects 114A, 114B, 114C to engage, that is, slide over, the associated line stabs 88A, 88B, 88C and load stabs 98A, 98B, 98C. Removal of the CM22 type circuit breaker 10 is essentially the reverse operation. That is, the levering mechanism shaft 172 is rotated the opposite direction causing the line primary disconnects 112A, 112B, 112C and load primary disconnects 114A, 114B, 114C to disengage, that is, slide over, the associated line stabs 88A, 88B, 88C and load stabs 98A, 98B, 98C.

The retrofit assembly 100 also includes a door handle system 300 structured to allow a user to actuate the circuit breaker contacts when the tank door 60 is closed. That is, as shown in FIGS. 7A-7C, the door handle system 300 includes a close button assembly 302 and a breaker trip bumper 304. It is understood that the circuit breaker 10 includes corresponding electronic buttons/levers structured to be engaged by the close button assembly 302 and the breaker trip bumper 304. When the button structured to be engaged by the close button assembly 302 is actuated, the closing motor 18 is actuated and the contacts are closed, providing all other safety devices and interlocks allow for the contacts to close. When the lever structured to be engaged by the breaker trip bumper 304 is actuated, the trip device 20 is actuated and causes the breaker 10 to manually trip.

The door 60 includes an outer handle 306 (FIG. 1) coupled in a fixed relationship to an inner disk 308 (FIGS. 6A-6C) that is rotatably coupled to the door 60. When the handle 306 is rotated by a user outside of the tank 50, the inner disk 308 rotates relative to the door 60. The inner disk 308 is structured to move between three positions; a neutral position, a close position, and a trip position. The neutral position is disposed between the close position and the trip position. The door handle system 300 also includes an elongated rod 312 and a return spring 314. The return spring 314 is coupled to, and disposed between, the door 60 and the rod 312. The return spring 314 is structured to be both compressed and in tension when the return spring 314 is in a neutral state. The rod 312 is disposed generally vertically and has an upper end 316 and a lower end 318. The rod upper end 316 is coupled to the inner disk 308 and structured to rotate therewith. The rod upper end 316 is also coupled to the close button actuator 310. The breaker trip bumper 304 is coupled to the rod lower end 318.

The door handle system 300 operates as follows. As shown in FIG. 6A, the return spring 314 is in a neutral state. This corresponds to the neutral position of the inner disk 308. The bias of the return spring 314 maintains the rod 312 in a position wherein neither the close button assembly 302 nor the breaker trip bumper 304 are actuating their associated buttons. Further, because the rod 312 is coupled to the inner disk 308, the bias of the return spring 314 maintains, the return spring 314 in the neutral position. When a user turns the outer handle 306 to the close position, the disk 308 rotates counterclockwise, as shown in FIG. 6B, and the close button assembly 302 engages the closing motor actuation button. As set forth above, this causes the closing motor 18 to be actuated and the contacts closed, providing all other safety devices and interlocks allow for the contact to close. This action also causes the rod 312 to move upwardly and compresses the return spring 314. When the user releases the outer handle 306, the bias of the return spring 314 causes the rod 312, and therefore the close button assembly 302, the inner disk 308 and the handle 306 to return to the neutral position.

Figure 6C:
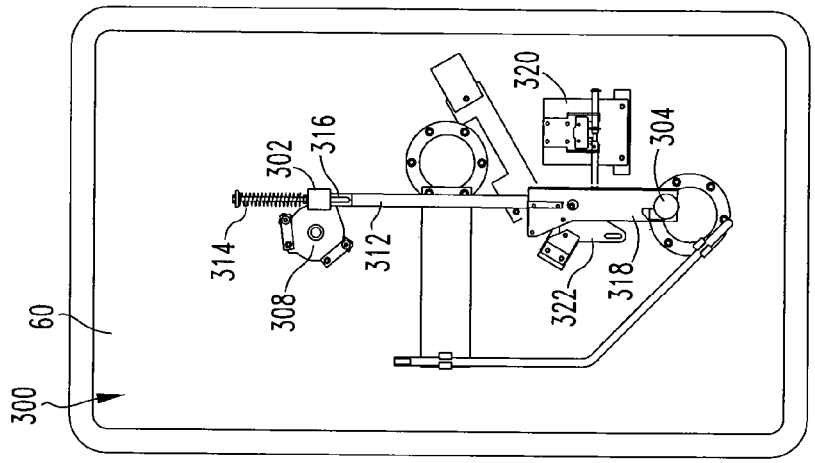
FIGS. 6A, 6B, and 6C are views of the inside of the tank housing assembly door showing the door handle system in a neutral position, a close position, and a trip position, respectively.
Figure 6B:
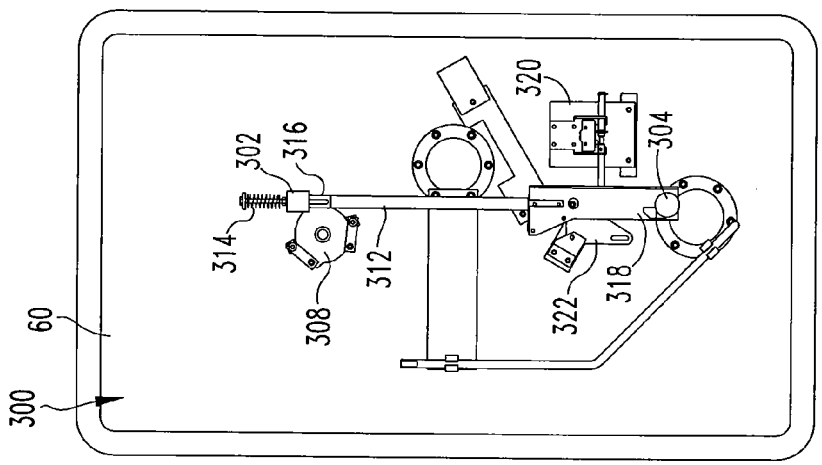
Figure 6A:
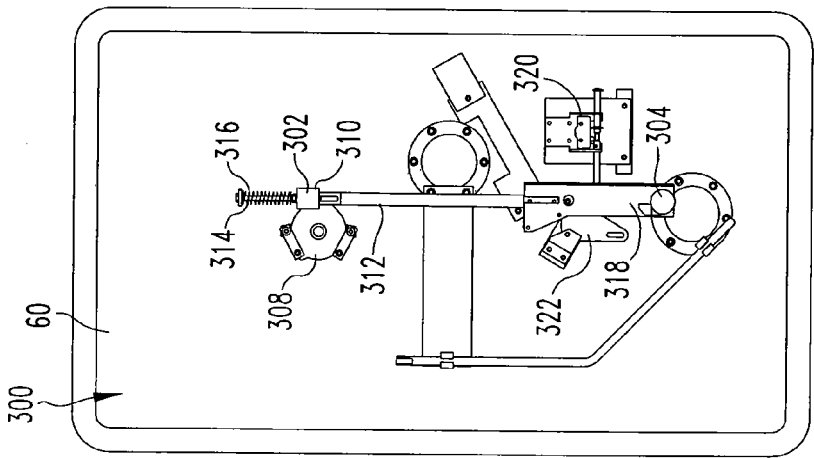

Similarly, when a user turns the outer handle 306 to the trip position, the disk 308 rotates clockwise which causes the rod 312 to move downwardly, as shown in FIG. 6C, and the breaker trip bumper 304 engages the trip device actuation lever. Again, when the handle 306 is released, the bias of the return spring 314 causes the rod 312, and therefore breaker trip bumper 304, the inner disk 308 and the handle 306 to return to the neutral position.

The door handle system 300 may also include a motor cutout switch 320. The motor cutout switch 320 is electronically coupled to the closing motor 18 and structured to disengage the power thereto. A pivot member 322 is coupled to the motor cutout switch 320 to the rod 312. The pivot member 322 is structured to actuate the motor cutout switch 320 when the a user turns the outer handle 306 to the trip position. That is, as the rod 312 moves downwardly, the motor cutout switch 320 is actuated and the closing motor 18 is inactive. This prevents the closing motor 18 from running, i.e. attempting to close the contacts, during a manual trip of the breaker 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A retrofit assembly for a CM22 type circuit breaker structured to adapt said circuit breaker so as to engage a CMD type enclosure, said CMD type enclosure being a tank having housing assembly with a plurality of members defining a generally enclosed space, said housing assembly members including a back member and movable door, said tank further including a bus assembly with a line bus assembly and a load bus assembly, said tank bus assembly coupled to said housing assembly back member, said tank bus assembly line bus assembly having a plurality of bus members each with a vertically extending stab, said tank bus assembly load bus assembly having a plurality of bus members each with a horizontally extending stab, said CM22 circuit breaker including a housing and a bus assembly having a line bus assembly and a load bus assembly, said circuit breaker bus assembly line bus assembly coupled to said circuit breaker housing and having three line buses, each said circuit breaker bus assembly line bus assembly line bus having a generally flat elongated body extending generally vertically and generally parallel to said housing assembly back member, said circuit breaker bus assembly load bus assembly coupled to said circuit breaker housing and having three load buses, each said circuit breaker bus assembly load bus assembly load bus having a generally flat elongated body with a distal end, each said circuit breaker bus assembly load bus assembly bus body extending generally vertically and generally parallel to said housing assembly back member, each said circuit breaker bus assembly load bus assembly bus distal end curving to extend generally horizontally and extending toward said housing assembly back member, said retrofit assembly comprising:
   a bus retrofit assembly having a line primary disconnect for each circuit breaker bus assembly line bus and a load primary disconnect for each circuit breaker bus assembly load bus;
   each said line primary disconnect and load primary disconnect having a plurality of conductive members disposed in two opposing lines and biased toward each other in a jaw-like manner;
   each said line primary disconnect coupled to, and in electrical communication with, a circuit breaker bus assembly line bus assembly bus with each said line primary disconnect oriented so that the line primary disconnect axis extends generally vertically;
   wherein each said circuit breaker bus assembly line bus assembly bus is structured to be coupled to, and in electrical communication with, a tank bus assembly line bus assembly bus by having each said line primary disconnect coupled to a tank bus assembly line bus assembly bus;
   each said load primary disconnect coupled to, and in electrical communication with, a circuit breaker bus assembly load bus assembly bus with each said load primary disconnect oriented so that the load primary disconnect axis extends generally horizontally; and
   wherein each said circuit breaker bus assembly load bus assembly bus is structured to be coupled to, and in electrical communication with, a tank bus assembly load bus assembly bus by having each said load primary disconnect coupled to a tank bus assembly load bus assembly bus.

2. The retrofit assembly of claim 1 wherein:
   said bus retrofit assembly includes a line coupling assembly having at least one lateral opening and a slot cut into each said circuit breaker bus assembly line bus assembly bus, a stem coupled to each said line primary disconnect, and at least one fastener;
   each said line coupling assembly opening intersecting with said line coupling assembly slot;
   each said line primary disconnect stem sized to fit snugly in a line coupling assembly slot;
   each said line primary disconnect stem being disposed in a line coupling assembly slot; and
   each fastener disposed in a line coupling assembly opening thereby securing each said line primary disconnect stem in a line coupling assembly slot.

3. The retrofit assembly of claim 2 wherein:
   each said line coupling assembly opening extends through an associated line coupling assembly slot, whereby each said line coupling assembly opening includes a proximal opening, adjacent a lateral of said each said circuit breaker bus assembly line bus assembly bus, and a distal bore, disposed on the inner side of each associated line coupling assembly slot;
   each said line primary disconnect stem includes at least one opening;
   each said line primary disconnect stem opening structured to align with said associated line coupling assembly opening when each said line primary disconnect stem is disposed in a line coupling assembly slot; and whereby a continuous passage consisting of each said line coupling assembly proximal opening, each said line primary disconnect stem opening, and each said line coupling assembly bore is created.

4. The retrofit assembly of claim 3 wherein each line coupling assembly slot extends generally longitudinally on the associated circuit breaker bus assembly line bus assembly bus.

5. The retrofit assembly of claim 4 wherein said bus retrofit assembly includes a load bus support assembly structured to resist horizontal flexing of said circuit breaker bus assembly load bus assembly buses.

6. The retrofit assembly of claim 5 wherein:
    said load bus support assembly includes a non-conducive mounting and an elongated support member for each circuit breaker bus assembly load bus assembly bus;
    each said load bus support assembly mounting coupled to a circuit breaker bus assembly load bus assembly bus; and
    each said load bus support assembly support member extending between, and coupled to, a load bus support assembly mounting and said circuit breaker housing.

7. The retrofit assembly of claim 6 wherein said circuit breaker includes arc chutes structured to vent arc gases, and wherein:
    each said load bus support assembly support member is disposed over an arc chute; and
    each said load bus support assembly support member has a protective covering.

8. The retrofit assembly of claim 6 wherein said tank housing assembly includes a pair of lateral side members and a pair of retractable rails coupled thereto and structured to move between an extended position and a retracted position, each said tank housing assembly lateral side member having a hook pocket disposed thereon, said retrofit assembly further comprising:
    a frame assembly having rollers structured to travel over said rails when said rails are in the extended position;
    a levering mechanism including an elongated shaft, a hook assembly disposed at each end of the shaft, a crank, and a worm and gear arrangement;
    said levering mechanism coupled to said circuit breaker, said levering mechanism shaft extending generally laterally across said circuit breaker;
    wherein, when said circuit breaker is positioned substantially within the tank with the line primary disconnects and load primary disconnects starting to engage the associated line stabs and load stabs, each said hook assembly is disposed adjacent to a hook pocket;
    wherein, said levering mechanism is structured to cause each said hook assembly to move through an arc and thereby engage a hook pocket when said worm and gear arrangement is engaged by said crank; and
    whereby said line primary disconnects and load primary disconnects engage the associated line stabs and load stabs.

9. The retrofit assembly of claim 8 wherein:
    each hook assembly includes an offset and a laterally extending hook;
    each offset extending radially from said levering mechanism shaft; and
    each laterally extending hook extending from the distal end of the associated offset.

10. The retrofit assembly of claim 9 wherein said circuit breaker includes one or more pairs of separable contacts, an operating mechanism, a closing motor and a trip device, said operating mechanism structured to separate and close said contacts, said closing motor structured to actuate said operating mechanism to close said contacts, said closing motor having an actuation button, said trip device structured to actuate said operating mechanism to close said contacts, said trip device having an actuation button, and wherein said retrofit assembly further includes:
    a door handle system coupled to said tank housing assembly door;
    said door handle system having an outer handle, an inner disk, an elongated rod, a return spring, a close button actuator and the breaker trip bumper;
    said rod having an upper end and a lower end, said close button actuator disposed at said rod upper end, said breaker trip bumper disposed at said rod lower end;
    said inner disk rotatably coupled to said door and structured to move between a neutral position, a close position, and a trip position;
    said outer handle fixed to said inner disk;
    said rod coupled to said inner disk and extending generally vertically;
    said return spring structured to be placed in tension and in compression from a neutral state, said return spring being disposed between said rod and said door;
    wherein, the bias of said return spring acting on said rod biases said inner disk to said neutral position;
    wherein when said inner disk is rotated to said close position, said close button actuator engages said closing motor actuation button; and
    wherein said inner disk is rotated to said trip position, said breaker trip bumper engages said trip device actuation lever.

11. The retrofit assembly of claim 10 wherein:
    said door handle system includes a motor cutout switch and a pivot member;
    said motor cutout switch being electronically coupled to said closing motor and structured to disengage the power to said closing motor;
    said pivot member structured to actuate said motor cutout switch and being coupled to said rod;
    wherein said inner disk is rotated to said trip position, said pivot member actuates said motor cutout switch; and
    whereby said closing motor is prevented from running when said circuit breaker is manually tripped.

12. The retrofit assembly of claim 8 wherein:
    said frame assembly includes two side plates and a cross-frame assembly, said frame assembly side plates held in a spaced relationship by said cross-frame assembly;
    said side plates laterally defining the space available to be occupied by said CM22 type circuit breaker;
    at least one said frame assembly rollers rotatably coupled to each said side plate.

13. The retrofit assembly of claim 2 wherein each line coupling assembly slot extends generally longitudinally on the associated circuit breaker bus assembly line bus assembly bus.

14. The retrofit assembly of claim 1 wherein said bus retrofit assembly includes a load bus support assembly structured to resist horizontal flexing of said circuit breaker bus assembly load bus assembly buses.

15. The retrofit assembly of claim 14 wherein:
    said load bus support assembly includes a non-conducive mounting and an elongated support member for each circuit breaker bus assembly load bus assembly bus;
    each said load bus support assembly mounting coupled to a circuit breaker bus assembly load bus assembly bus; and each said load bus support assembly support member extending between, and coupled to, a load bus support assembly mounting and said circuit breaker housing.

16. The retrofit assembly of claim 15 wherein said circuit breaker includes arc chutes structured to vent arc gases, and wherein:
- each said load bus support assembly support member is disposed over an arc chute; and
- each said load bus support assembly support member has a protective covering.

17. The retrofit assembly of claim 1 wherein said tank housing assembly includes a pair of lateral side members and a pair of retractable rails coupled thereto and structured to move between an extended position and a retracted position, each said tank housing assembly lateral side member having a hook pocket disposed thereon, said circuit breaker includes a frame assembly having rollers structured to travel over said rails when said rails are in the extended position, said retrofit assembly further comprising:
- a levering mechanism including an elongated shaft, a hook assembly disposed at each end of the shaft, a crank, and a worm and gear arrangement;
- said levering mechanism coupled to said circuit breaker, said levering mechanism shaft extending generally laterally across said circuit breaker;
- wherein, when said circuit breaker is positioned substantially within the tank with the line primary disconnects and load primary disconnects starting to engage the associated line stabs and load stabs, each said hook assembly is disposed adjacent to a hook pocket; and
- wherein, said levering mechanism is structured to cause each said hook assembly to move through an arc and thereby engage a hook pocket when said worm and gear arrangement is engaged by said crank; and
- whereby said line primary disconnects and load primary disconnects engage the associated line stabs and load stabs.

18. The retrofit assembly of claim 17 wherein:
- each hook assembly includes an offset and a laterally extending hook;
- each offset extending radially from said levering mechanism shaft; and
- each laterally extending hook extending from the distal end of the associated offset.

19. The retrofit assembly of claim 1 wherein said circuit breaker includes one or more pairs of separable contacts, an operating mechanism, a closing motor and a trip device, said operating mechanism structured to separate and close said contacts, said closing motor structured to actuate said operating mechanism to close said contacts, said closing motor having an actuation button, said trip device structured to actuate said operating mechanism to close said contacts, said trip device having an actuation button, and wherein said retrofit assembly further includes:
- a door handle system coupled to said tank housing assembly door;
- said door handle system having an outer handle, an inner disk, an elongated rod, a return spring, a close button actuator and the breaker trip bumper;
- said rod having an upper end and a lower end, said close button actuator disposed at said rod upper end, said breaker trip bumper disposed at said rod lower end;
- said inner disk rotatably coupled to said door and structured to move between a neutral position, a close position, and a trip position;
- said outer handle fixed to said inner disk;
- said rod coupled to said inner disk and extending generally vertically;
- said return spring structured to be placed in tension and in compression from a neutral state, said return spring being disposed between said rod and said door;
- wherein, the bias of said return spring acting on said rod biases said inner disk to said neutral position;
- wherein when said inner disk is rotated to said close position, said close button actuator engages said closing motor actuation button; and
- wherein said inner disk is rotated to said trip position, said breaker trip bumper engages said trip device actuation lever.

20. The retrofit assembly of claim 19 wherein:
- said door handle system includes a motor cutout switch and a pivot member;
- said motor cutout switch being electronically coupled to said closing motor and structured to disengage the power to said closing motor;
- said pivot member structured to actuate said motor cutout switch and being coupled to said rod;
- wherein said inner disk is rotated to said trip position, said pivot member actuates said motor cutout switch; and
- whereby said closing motor is prevented from running when said circuit breaker is manually tripped.

* * * * *